June 22, 1948. C. A. ARENS 2,444,001
APPARATUS FOR MAKING TRANSMISSION CABLES
Filed June 28, 1944 3 Sheets-Sheet 2
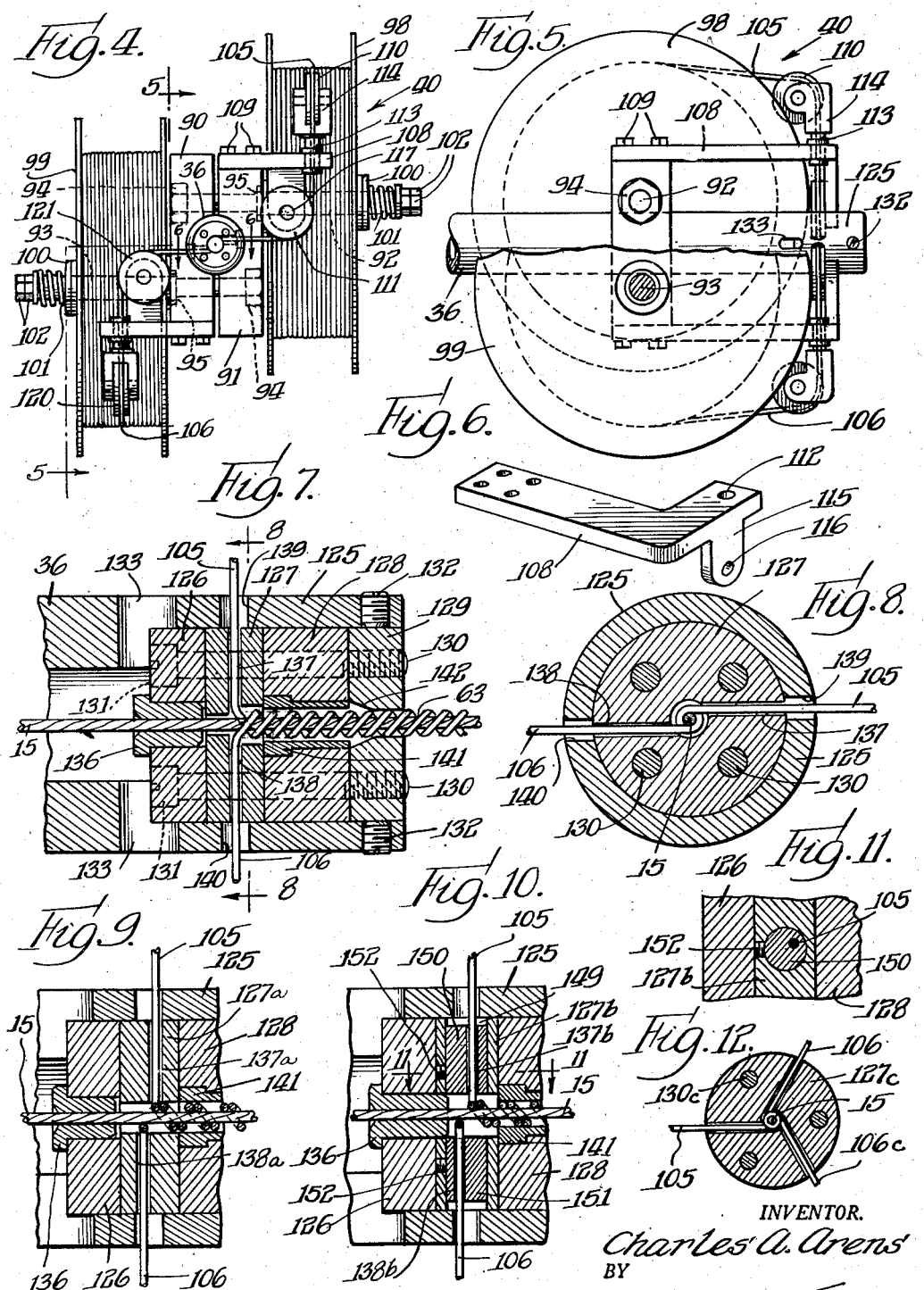
INVENTOR.
Charles A. Arens
BY
Loftus, Moore, Olson & Trexler
Attys.

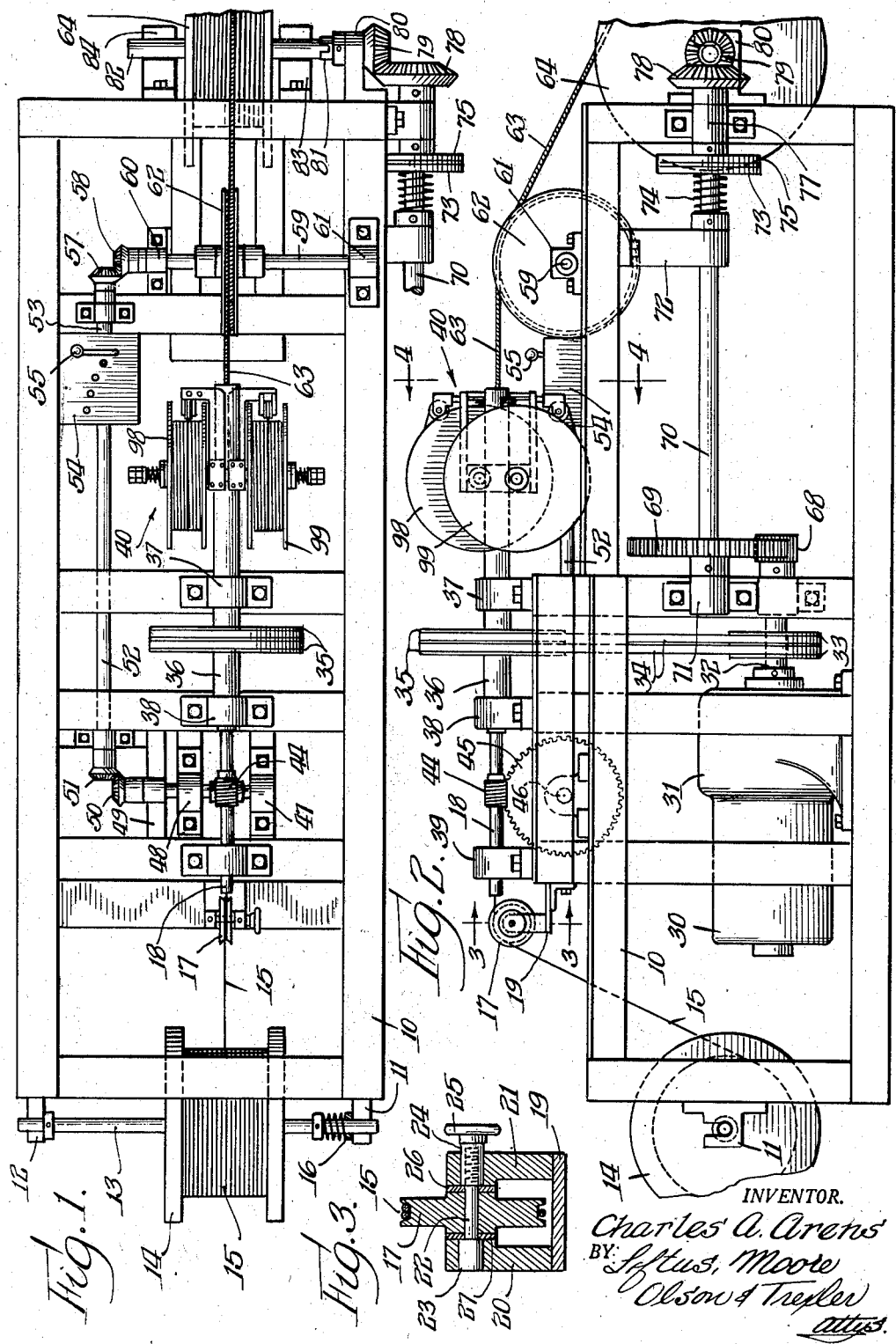

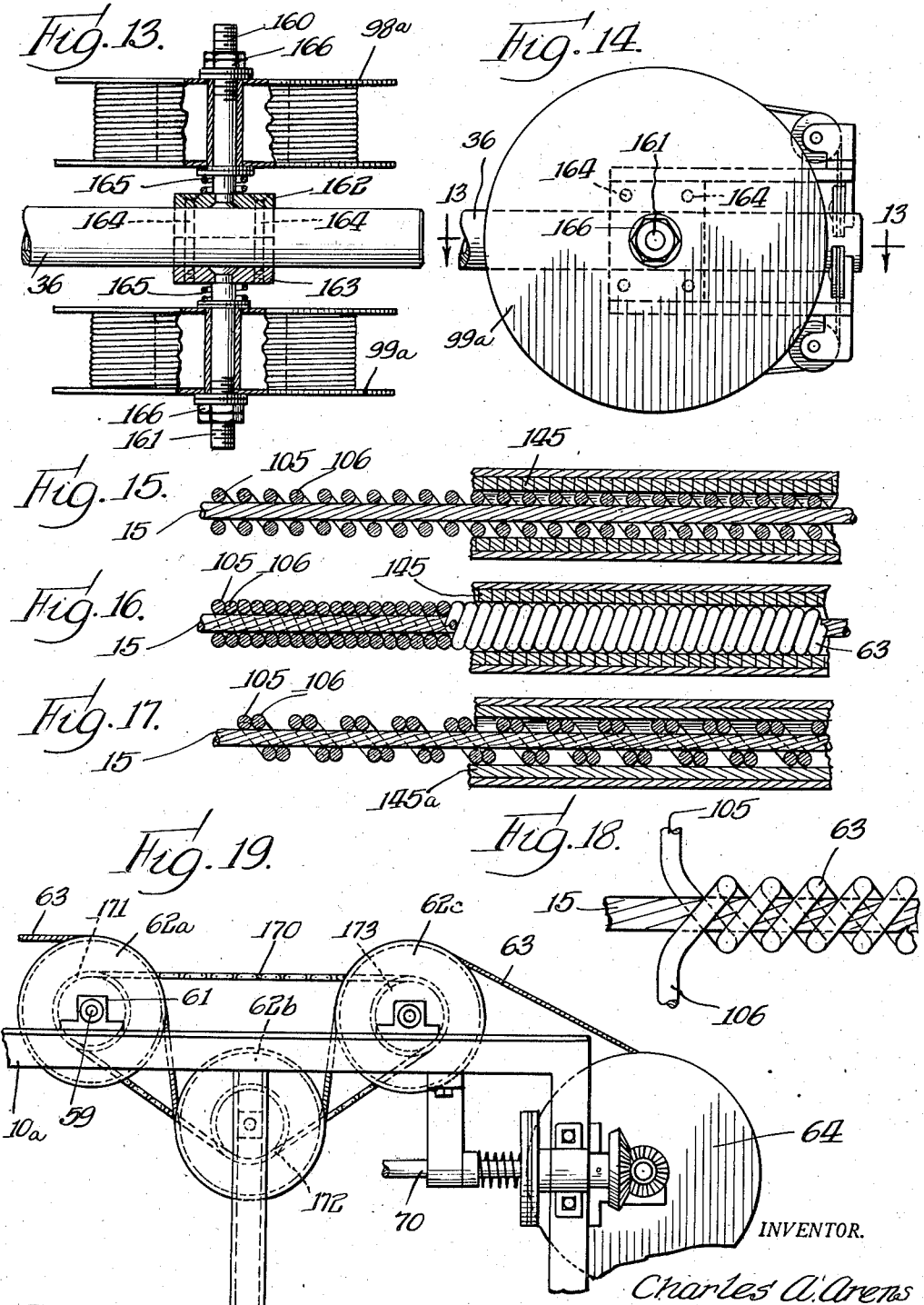

Patented June 22, 1948

2,444,001

UNITED STATES PATENT OFFICE 2,444,001

APPARATUS FOR MAKING TRANSMISSION CABLES

Charles A. Arens, Chicago, Ill., assignor to Arens Controls, Inc., Chicago, Ill., a corporation of Illinois Application June 28, 1944, Serial No. 542,581

6 Claims. (Cl. 57—13)

This invention relates to methods and apparatus for making transmission cables of the type adapted to transmit mechanical forces and movements between predetermined operating stations.

It is an object of the invention to provide new and improved methods and apparatus for making transmission cables of the type stated.

More specifically, it is an object of the invention to provide improved and readily operable methods and apparatus for making transmission cables of the type defined, in a continuous manner, and of any desired length; and to provide readily operable and satisfactory methods and apparatus for making transmission cables of improved construction and which have improved operating characteristics in service.

Further objects of the invention are to provide improved means and methods for making a composite inner shiftable structure for transmission cables of the type defined, in a continuous single operation; and wherein the size and stiffness of the structure may be accurately controlled; and wherein the forming of the structure at the forming station is effected in a balanced manner and with a minimum distortion and stress of the parts.

Various other objects, advantages and features of the invention will be apparent from the following description when taken in connection with the accompanying drawings wherein certain preferred embodiments of the invention are set forth for purposes of illustration.

In the drawings, wherein like reference numerals refer to like parts throughout:

Fig. 1 is a general plan view of an apparatus for forming mechanical transmission cables, embodying the principles of the invention and adapted to carry out the methods thereof;

Fig. 2 is a side elevation of the apparatus illustrated in Fig. 1;

Fig. 3 is a detail view on an enlarged scale of the inlet guide roller for the core wire, taken as indicated by the line 3—3 of Fig. 2;

Fig. 4 is a detail view on an enlarged scale of the winding or forming head structure, taken as indicated by the line 4—4 of Fig. 2;

Fig. 5 is a view of the winding head structure, taken as indicated by the broken line 5—5 of Fig. 4;

Fig. 6 is a detail perspective view of one of the support brackets forming a part of the winding head structure;

Fig. 7 is a detail longitudinal sectional view, on a further enlarged scale, of a part of the winding head, and more particularly illustrating the forming or working dies;

Fig. 8 is a transverse sectional view of the structure of Fig. 7, on the line 8—8 thereof;

Figs. 9 and 10 are views similar to Fig. 7, but illustrating modified embodiments;

Fig. 11 is a detail sectional view of a part of the structure of Fig. 10, and taken as indicated by the line 11—11 thereof;

Fig. 12 is an illustrative view showing a modification;

Figs. 13 and 14 are views illustrating a modified reel support for the winding head, Fig. 13 being taken as indicated by the line 13—13 of Fig. 14;

Figs. 15, 16 and 17 are views showing the completed shiftable inner cable structures, arranged within their associated housing sheaths;

Fig. 18 is a detail view on a magnified scale illustrating the detail of the cable structure, as made by the machine; and Fig. 19 is a partial view illustrating a modified feeding arrangement for controlling the feeding speed of the cable structure in its passage through the machine.

This application is a continuation-in-part of my copending application, Serial No. 538,170, filed May 31, 1944, now Patent No. 2,438,380, March 23, 1948, and entitled "Transmission cable." The present case relates to apparatus and methods for making the cable structure of said copending application.

Referring to the drawings, and first to the embodiment of the invention illustrated in Figs. 1 to 8 inclusive, in Figs. 1 and 2 an apparatus is illustrated comprising an integral frame structure 10 by means of which the various elements of the machine are supported. Carried at one end of the frame is a pair of support brackets 11 and 12 adapted to receive the support shaft 13 of a supply reel 14 upon which the core wire 15 which is to form a part of the completed cable structure, is wound. The shaft 13 is freely removable from the support brackets 11 and 12 to permit ready removal and replacement of the core wire supply reels, so as to permit replacement and the use of different types and kinds of core wires, as will be required. A spring pressed collar 16 may be employed to impart a light frictional drag to movement of the supply reel.

The core wire 15 is lead from the supply reel 14 over a guide roller or wheel 17, Figs. 1, 2 and 3, by means of which the wire is guided into a rotatable guide sleeve 18, and also by means of which a controlled adjustable frictional drag may, if desired, be imparted to the wire. More particularly, referring to Fig. 3, a support bracket 19 is carried by the machine frame 10, this support bracket in turn carrying a pair of upstanding support blocks 20 and 21 provided with aligned openings. A non-rotatable shaft 22 is carried within these openings, said shaft having an enlarged portion 23 at one end, within the opening of the member 20, and the other end of the shaft being threaded for threaded engagement within a sleeve 24 provided with an adjustable hand wheel 25. The roller 17 is rotatably mounted upon the shaft 22, and a pair of friction discs 26 and 27 are disposed on opposite sides of the wheel, as indicated. The enlarged shaft portion 23 may be splined or otherwise non-rotatably secured within its support block 20. It will be seen that by rotational mechanical adjustment of the hand wheel 25, the sleeve 24 and enlarged shaft portion 23 may be brought to bear against the friction discs 26 and 27, whereby to impart a frictional drag upon the roller 17 and upon the core wire, if desired.

A main driving motor 30, preferably provided with a variable speed reduction drive 31 is arranged to operate a main drive shaft 32. This drive shaft carries a pair of drive pulleys 33 engaged by the belts 34, whereby to drive a pair of driven pulleys 35 secured to an elongated driving sleeve 36 disposed for rotation at the upper part of the machine. This driving sleeve is journalled in a pair of bearings 37 and 38, and is rigidly connected to the sleeve 18, the latter being journalled for rotation in a bearing 39. The sleeves 18 and 36 are rigidly connected together and are disposed in longitudinal continuation, so that the core wire 15 may be passed continuously therethrough. The winding head, generally indicated by the numeral 40 is rigidly carried by the sleeve 36. The construction of the head will be later described.

A worm 44 is fixed to the sleeve 18, and is adapted to mesh with a worm gear 45 fixed to a cross shaft 46 journalled in a set of bearings 47, 48 and 49. The end of the shaft 46 carries a beveled gear 50, Fig. 1, adapted to mesh with and drive a bevel gear 51 connected to one end of a shaft 52 extending longitudinally of the machine. This shaft 52 is connected to a drive shaft 53 through the intermediary of a change speed gear box 54. This gear box may be of any suitable standard construction having a series of change speed gears selectively controllable by means of a handle 55 whereby to impart different drive speed ratios between the shafts 52 and 53. In one position of the handle 55 the shaft 52 is disconnected from the shaft 53 so as to impart no driving motion thereto, as will be understood.

The driven shaft 53 carries a bevel gear 57 arranged to mesh with and drive a bevel gear 58 secured to a transversely extending shaft 59 journalled in bearings 60 and 61 and carrying a drive wheel or roller 62. The completed cable, designated by the numeral 63, as it emerges from the winding head, is wrapped around the wheel 62 and then passes to a take-up reel 64 upon which it is coiled and stored for use. It will be seen that by controlling the driven speed of rotation of the wheel 62, through the intermediary of the change speed gear box 54, the speed of travel of the completed cable structure may be accurately controlled, for a purpose later to be more specifically described.

Means is preferably provided for yieldably driving the take-up reel 64, so as to maintain the cable 63 under slight tension, in gripping engagement with the drive wheel 62, and also so that the cable can be properly coiled upon the take-up reel. To this end, the main drive shaft 32 is provided on its end with a gear 68, Fig. 2, adapted to mesh with and drive a gear 69 secured to a longitudinally extending shaft 70 journalled in a pair of bearing brackets 71 and 72. The end of the shaft 70 carries a friction disc 73 spring pressed by means of a spring 74 into engagement with a co-mating friction disc 75 secured to one end of a stub shaft journalled in a bearing block 77. The other end of this stub shaft carries a bevel gear 78 adapted to mesh with and drive a bevel gear 79 carried on one end of a stub shaft journalled in a bearing block 80. The other end of this latter stub shaft is adapted to be removably connected by means of a key connection 81 with the axle shaft 82 of the take-up reel 64, the shaft 82 being removably mounted within a pair of support brackets 83 and 84.

It will be seen that by reason of the connections provided, the take-up reel 64 will be yieldably driven from the shaft 70 during operation of the machine. However, while the speed of the shaft 70 may be substantially constant, due to the slip drive connection 73—75, only such proper speed of rotation will be imparted to the take-up reel as is necessary to keep the cable 63 taut. Due to the key connection 81, the take-up reel 64 may be readily removed from the frame support brackets 83 and 84, whereby to permit replacement and substitution of different take-up reels, as will be understood. When the wheel 62 is being driven from the change speed gear box 54, its speed of operation determines the longitudinal speed of travel of the cable 63. When the change speed gear box is adjusted to disconnect the shafts 52 and 53, so that the wheel 62 is arranged for free rotation, the longitudinal speed of travel of the cable is controlled by the action of the winding head, as will presently be described.

The winding or forming head 40 is best illustrated in Figs. 4, 5, 6, 7 and 8. Referring first to Figs. 4 and 5, it will be seen that the winding head comprises a pair of clamp blocks 90 and 91 arranged to cooperatively grip and thus be secured to the elongated driving sleeve 36, for rotation therewith. More particularly, a pair of bolts 92 and 93 extend through the blocks 90 and 91, projecting therefrom in opposite directions. These bolts are provided with threaded nuts 94 and with shoulders 95, whereby as the nuts are tightened upon the bolts the clamp blocks 90 and 91 will be brought into tight gripping engagement with the drive sleeve 36.

A pair of supply reels 98 and 99 are carried, respectively, by the bolts 92 and 93, the reels being rotatable on the bolts under a predetermined frictional drag. In order to impart such frictional drag, friction discs 100 are provided, respectively engageable with the reels, being urged into frictional engagement by means of compression springs 101, the tension of which may be controlled by the adjustable lock nuts 102. By means of the lock nuts, a predetermined desired drag may be placed upon the supply reels, in their rotation upon the bolts.

The supply reel 98 is adapted to supply a wire 105 to the winding or forming station, whereas the supply reel 99 is adapted similarly to supply a wire 106. To guide the wire 105 in its movements, a support bracket 108 mounted on the clamp block 91 by means of bolts 109 is provided for supporting a pair of guide rollers 110 and 111. The shaping of the support bracket 108 is illustrated in perspective detail in Fig. 6. The bracket is provided at its end with an opening 112 adapted to rotatably receive the shaft portion 113 of a bifurcated or yoke member 114 in which the guide roll 110 is rotatably supported. The bracket 108 is also provided on its end with a depending portion 115 provided with an opening 116 for receiving the axle shaft 117 of the guide roller 111. It will be seen that the rollers 110 and 111 guide the wire 105 from the supply reel to the winding station, the yoke member 114 being swiveled on its support shaft 113 to accommodate the movements of the wire as it is supplied from various positions on its supply reel.

Similar means, comprising the rollers 120 and 121, are provided for guiding the wire 106 from its supply reel 99 to the forming station.

Referring more particularly to Figs. 7 and 8, it will be seen that the elongated driving sleeve 36 is provided on its end with a counterbored portion 125 into which the forming die structures are adapted to be fitted. The forming die structure, in the particular embodiment illustrated, comprises a series of four disc or collar members 126, 127, 128 anud 129 held together as a structural unit by a series of studs 130, and adapted to be applied as a unit, after assembly together, to the counterbored portion 125 of the driving sleeve. As will be understood, the studs 130 are screw threaded into the collar member 129, and are provided with enlarged head portions 131 at their opposite ends, whereby to hold the collar members together as a structural unit. The die structure is held within the sleeve counterbore by means of a series of clamping set screws 132. The drive sleeve 36 is provided with a diametrically extending bore or slot 133, Figs. 5 and 7, by means of which the die structure may be ejected from the sleeve, upon insertion of a suitable tool and upon loosening of the set screws 132.

The collar 126 carries a press fitted annular guide member or bushing 136 having a close sliding fit with the core wire for guiding the core wire 15 to the forming station, whereas the collar 127 is provided with a pair of generally radially extending passages 137 and 138 for guiding the wires 105 and 106 to the forming or winding station. Passages 139 and 140 are also provided in the counterbored portion 125 of the driving sleeve, for accommodating the wires 105 and 106. The collar 128 carries a press fitted guide bushing 141 for loosely embracing and guiding the completed cable structure, and the collar 129 is provided with a central tapered die portion 142 through which the completed cable 63 is adapted to be forcibly drawn or projected whereby to be accurately gauged to a predetermined size.

In the operation of the structure, it will be seen that as the driving sleeve 36 is rotated the supply reels 98 and 99 are bodily moved therewith, and also rotated on the bolts 92 and 93 whereby to deliver the wires 105 and 106, under predetermined tension, to the forming station. At the forming station the wires 105 and 106 are wrapped tightly around the central core wire 15, the latter being non-rotatable, but longitudinally transmitted to the forming station from the supply reel 14 through the sleeves 18 and 36. The completed cable, comprising the core wire 15 and the wrapped coil wires 105 and 106 are drawn through the sizing die 142, whereby to be accurately gauged to size.

By adjusting the change speed gear box 54 the drive wheel or roller 62 may be caused to withdraw the completed cable structure from the winding or forming head at any desired rate, whereby to control the lead or pitch of the coil wires. For example, as illustrated in Figs. 7, 15 and 18, the cable structure is withdrawn from the forming head at a rate so that the coil wires 105 and 106 will be in open pitch relationship. This open pitch arrangement reduces weight and cost in the completed structure, while at the same time permitting the coil wires to reinforce the central core wire 15 at closely spaced points so as to enable the core wire to directly absorb compression as well as tension in the operation of the completed cable structure. The features and advantages of a composite inner cable structure of this type are discussed more fully in said copending application, Serial No. 538,170.

It will be seen that the composite cable structure comprising the core wire 15 and the coil wires 105 and 106 may be continuously produced in any desired length, and accumulated upon the take-up reel 64. The composite structure, in its final form, is produced in a single continuous operation. The tension of the two wires 105 and 106 is balanced at the forming station. In this way there is no tendency to pull the core wire 15 out of position, and the winding is effected with a minimum distortion or stress of the wires, and a symmetrical and uniform structure is provided. It will further be noted that the bodily movable wire supply reels 98 and 99 are disposed parallel to the axis of rotation of the sleeve 36 so that centrifugal force of rotation does not tend to loosen or disturb the coils of wire on the supply reels. By substitution of one or more of the die collars 126, 127, 128 and 129, cable structures of different sizes may be produced.

By varying the speed of the drive roller 62, the pitch of the convolutions of the wires 105 and 106, as they are wound upon the core wire 15, may be varied whereby to vary the stiffness of the completed cable structure 63. If the change speed gearing 54 is disconnected so as to permit the drive wheel 62 to turn freely, the coiling of the wires 105 and 106 upon the central core wire will determine the rate of longitudinal movement of the core wire and of the finished cable structure, the finished cable in this instance being pushed rather than pulled from the winding head. In this instance the convolutions of the coil wires 105 and 106 will be substantially in abutting relationship, as shown in Fig. 16.

In Figs. 15 and 16 the composite inner cable structures, formed by the apparatus, are illustrated within an outer exible sheath 145, which may comprise a helical wire coil, whereby to provide a flexible transmission cable structure. As will be understood, the composite inner structure comprising the core wire 15 and the coil wires 105 and 106 is shiftable as a unit within the sheath or housing 145. The core wire 15 may, for example, comprise a stranded cable, as shown, whereas the wires 105 and 106 are preferably of piano wire type.

In Fig. 9 a modified arrangement is illustrated for producing a cable structure as shown in Fig. 17, wherein the convolutions of the wires 105 and 106 will be in alternate contacting and spaced relation, as may in certain instances be desirable. As shown in Fig. 9, the collar or disc member 127 is in this instance replaced by collar member 127a wherein the radial passages 137a and 138a are axially offset so as to provide the desired spaced relationship. The structure otherwise may be the same as previously described. In Fig. 17 the sheath 145a within which the composite inner cable structure is shiftable, is in this instance illustrated as being of rigid construction.

In Figs. 10 and 11 an embodiment is illustrated for producing a cable as in Fig. 9, but wherein replacement or substitution of the die collar, such as the collar 127a, is not required. In this instance the collar member 127b, corresponding in function and purpose to the collar member 127a previously described, is provided with a diametrically extending bore 149. Plug members 150 and 151 are received within the bore 149, and adjustably held therein by means of set screws 152. The plug members are provided with radial passages 137b and 138b, corresponding to the radial passages previously described, but by rotatably adjusting the plug members, the axial spacing of the radial passages may be varied. As will be seen by reference to Fig. 11, the axial spacing may be varied over a relatively wide range without appreciably changing the lateral offset of the passages from the center line of the rotatable driving sleeve 36.

Various numbers of coil wires, corresponding to the wires 105 and 106, may be simultaneously wrapped upon the core wire 15, without disturbing the balanced or symmetrical operation of the structure.

In Fig. 12 a forming die member 127c is illustrated, such as would be used for wrapping three coil wires 105, 106 and 106c around the central core wire 15, in symmetrical and balanced relationship.

In Figs. 13 and 14 a modified form of winding head is illustrated, incorporating means for radially adjusting the supply reels for the wires 105 and 106, in the event of an unequal wire supply on the two reels, so as to balance the centrifugal forces in the operation of the structure. In this instance the supply reels 98a and 99a are carried by a pair of studs 160 and 161 secured to and extending from a pair of clamp blocks 162 and 163 held in clamping engagement with the drive sleeve 36, by means of bolts 164. Compression springs 165 urge the reels outwardly respectively on the studs 160 and 161 a distance permitted by adjustment nuts 166. By adjusting the nuts 166 the reels may be individually shifted toward or away from the axis of rotation of the sleeve 36 whereby to compensate for uneven weights of the wire on the reels. The compression springs 165 also provide a frictional resistance to rotation of the reels upon their pivot studs. As will be seen particularly by reference to Fig. 14, the two supply reels 98a and 99a are in transverse alignment, rather than being offset slightly, as in the structural embodiment previously described.

In Fig. 19 a modified form of driving means for withdrawing the completed cable structure from the winding head is illustrated. In this instance, instead of using a single driving roller 62, a series of driving rollers 62a, 62b are 62c are provided, over which the cable 63 is passed in the manner illustrated. The roller 62a may be driven from its drive shaft 59 as in the structure previously described, and the rollers 62b and 62c may be driven therewith by means of a flexible chain 170 engageable with sprocket wheels 171, 172 and 173 fixed to the driving rollers. In the arrangement of Fig. 19, the cable 63 has only a partial arc of contact with each driving roller. Any suitable number of driving rollers may be employed in staggered relationship as shown. The chain and sprocket drive insures that the driving rollers will remain in proper synchronized speed relation.

It is obvious that various changes may be made in the specific embodiments set forth for purposes of illustration without departing from the spirit of the invention. Accordingly the invention is not to be limited to the specific embodiments shown and described, but only as indicated in the following claims.

The invention is hereby claimed as follows:

1. An apparatus for forming the composite inner structure of a mechanical transmission cable comprising a supply source for core wire, a take-off device, means for guiding the core wire from the supply source through a forming station to the take-off device along a predetermined path of travel, said guiding means comprising a rotatable hollow sleeve through which the core wire is adapted to be propelled, a winding head carried by said sleeve, a supply source for coil wire carried with the winding head, a plurality of relatively angularly disposed pulleys for guiding the coil wire from said last named supply source to the forming station, and means at the forming station for coiling the coil wire around the core wire in predetermined pitch relationship.

2. An apparatus for forming the composite inner structure of a mechanical transmission cable comprising a supply source for core wire, a take-off device, means for guiding the core wire from the supply source through a forming station to the take-off device along a predetermined path of travel, said guiding means comprising a rotatable hollow sleeve through which the core wire is adapted to be propelled, a winding head carried by said sleeve, a supply source for a plurality of coil wires carried with the winding head, a plurality of relatively angularly disposed pulleys for each supply source also carried with said winding head for guiding the coil wires from said last named supply source to the forming station, and means at the forming station for coiling the coil wires around the core wire in multiple pitch relationship.

3. An apparatus for forming the composite inner structure of a mechanical transmission cable comprising a supply source for core wire, a take-off device, means for guiding the core wire from the supply source through a forming station to the take-off device along a predetermined path of travel, a rotatable winding head, a supply source for a plurality of coil wires carried with said head, means also carried with the head for guiding the coil wires from said last named supply source to the forming station, and means at the forming station for coiling the coil wires around the core wire in predetermined multiple pitch relationship, said last named means comprising a forming member carried with the winding head, said forming member having an axial passage through which the core wire is propelled, and a plurality of radial passages extending radially outwardly from said axial passage through which the coil wires are adapted to be moved, and means for adjusting said forming member to vary the axial positioning of the radial passages.

4. An apparatus for forming the composite inner structure of a mechanical transmission cable comprising a supply source for core wire, a take-off device, means for guiding the core wire from the supply source through a forming station to the take-off device along a predetermined path of travel, a rotatable winding head, a supply source for a plurality of coil wires carried with said head, means also carried with the head for guiding the coil wires from said last named supply source to the forming station, and means at the forming station for coiling the coil wires around the core wire in predetermined multiple pitch relationship, said last named means comprising a forming member carried with the winding head, said forming member having an axial passage through which the core wire is propelled, and a plurality of coplanar radial passages extending radially outwardly from said axial passage and merging tangentially therewith through which the coil wires are adapted to be moved for varying the axial positioning of the radial passages of said forming member.

5. An apparatus for forming the composite inner structure of a mechanical transmission cable comprising a supply source for core wire, a take-off device, means including an annular guide member having a close sliding fit with the core wire for guiding the core wire from the supply source through a forming station to the take-off device along a predetermined path of travel, means for applying a predetermined friction to the core wire in its movement to the forming station, a supply source for coil wire, means including a rotatable head having a plurality of substantially radial coplanar passages for guiding the coil wire from said last named supply source to the forming station, and means at the forming station for coiling the coil wire around the core wire in predetermined pitch relationship.

6. An apparatus for forming the composite inner structure of a mechanical transmission cable comprising a supply source for core wire, a take-off device, means including an annular guide member having a close sliding fit with the core wire for guiding the core wire from the supply source through a forming station to the take-off device along a predetermined path of travel, means for applying a predetermined friction to the core wire in its movement to the forming station, a supply source for a plurality of coil wires, means including a rotatable head having a plurality of substantially radial coplanar passages for guiding the coil wires from said last named supply source to the forming station, means for applying a predetermined friction to the coil wires in their movement to the forming station, and means at the forming station for coiling the coil wires around the core wire in predetermined movable pitch relationship.

CHARLES A. ARENS.

REFERENCES CITED

The following references are of record in the file of this patent:

UNITED STATES PATENTS

| Number | Name | Date |
|---|---|---|
| 61,261 | Rodgers | Jan. 15, 1867 |
| 187,943 | Van Loon | Feb. 27, 1877 |
| 334,709 | Kruesi et al. | Jan. 19, 1886 |
| 477,784 | Sisum | June 28, 1892 |
| 1,375,655 | Heany | Apr. 19, 1921 |
| 1,512,116 | Lightfoot | Oct. 21, 1924 |
| 1,843,149 | Eaton | Feb. 2, 1932 |
| 1,984,405 | Fantone et al. | Dec. 18, 1934 |
| 1,992,707 | Lloyd | Feb. 26, 1935 |
| 2,095,551 | Johannessen et al. | Oct. 12, 1937 |
| 2,114,400 | Parvin | Apr. 19, 1938 |
| 2,114,496 | Keating | Apr. 19, 1938 |

FOREIGN PATENTS

| Number | Country | Date |
|---|---|---|
| 16,582 | Switzerland | June 8, 1898 |
| 155,797 | Germany | Nov. 4, 1904 |